US008305447B1

(12) United States Patent
Wong

(10) Patent No.: US 8,305,447 B1
(45) Date of Patent: Nov. 6, 2012

(54) SECURITY THREAT DETECTION SYSTEM

(76) Inventor: Thomas K. Wong, San Francisco, CA (US)

( * ) Notice: Subject to any disclaimer, the term of this patent is extended or adjusted under 35 U.S.C. 154(b) by 520 days.

(21) Appl. No.: 12/583,975

(22) Filed: Aug. 27, 2009

(51) Int. Cl.
*H04N 7/18* (2006.01)

(52) U.S. Cl. ........ 348/151; 348/155; 348/159; 382/103; 382/107; 382/146

(58) Field of Classification Search .................. 348/151, 348/153–155, 159, 625, 630, 675, 708, 718–721; 382/103, 107, 146, 242, 243; 725/9, 10, 725/14, 17
See application file for complete search history.

(56) References Cited

U.S. PATENT DOCUMENTS 5,767,765 A * 6/1998 Shoup ........................ 340/425.5
5,980,123 A * 11/1999 Heifler .......................... 396/427
6,476,858 B1 * 11/2002 Ramirez Diaz et al. ...... 348/159
6,829,371 B1 * 12/2004 Nichani et al. ................ 382/103
6,844,555 B2 * 1/2005 Beasley ........................ 250/342
7,015,943 B2 * 3/2006 Chiang .......................... 348/143
7,167,575 B1 * 1/2007 Nichani et al. ................ 382/103
2005/0285942 A1 * 12/2005 Lin et al. ....................... 348/155
2006/0215022 A1 * 9/2006 Damabhorn .................. 348/143
2008/0180537 A1 * 7/2008 Weinberg et al. ........ 348/211.99
2010/0097216 A1 * 4/2010 Morcom ....................... 340/555

* cited by examiner

*Primary Examiner* — Lashonda Jacobs
(74) *Attorney, Agent, or Firm* — Thomas R. Lampe

(57) ABSTRACT

A system for detecting intrusion into a space which includes motion detection light structure for producing and projecting a light pattern formed by a plurality of light beams of a certain character into a space and video motion detecting structure including a video camera having a field of view including at least some of the light pattern to detect intrusion into the light pattern. When motion is detected, images of the video camera are transmitted for threat assessment, and a scene illumination light is activated to improve visibility during nighttime operation.

37 Claims, 8 Drawing Sheets

SECURITY THREAT DETECTION SYSTEM

TECHNICAL FIELD

This invention relates to an apparatus and a method for detecting intrusion into a space and security threat assessment.

BACKGROUND OF THE INVENTION

Intrusion detection devices have been available for decades and more than two-dozen types of intrusion detection technologies are currently in use. In general, the performance and cost of indoor intrusion detection devices are satisfactory. However, outdoor intrusion detection devices are far from desirable in terms of both performance and cost. The environmental factors and detection distance in an outdoor setting are the two main challenges. For example, a passive infrared motion detector, currently considered to be one of the most common types of intrusion detection device, has limited effectiveness for outdoor applications due to its limited detection distance and high false alarm rate in an outdoor environment.

For outdoor detection where significant distances (such as longer than 40 feet) are involved, photoelectric beams and microwave detectors are more commonly used as they have lower false alarm rates and longer detection range. For distance more than a few hundred feet, bistatic units (separate transmitter and receiver units) are usually required for both photoelectric beams and microwave. Good alignment of the transmitter and receiver is critical, which makes installation more difficult and the system more vulnerable to defeat. Installing intrusion detection cables around a premise is also an option, but the installation costs of the cable and the required supporting electronics are very high. For very long-range outdoor intrusion detection, radar is sometimes used, but it is even more costly.

Even if one sets aside important issues such as cost, vulnerability to defeat, and probability of detection, none of the above mentioned technologies have a perfect false alarm rate. Despite the incorporation of sophisticated electronics, they cannot ascertain with certainty if an intrusion alarm is a real threat or a false alarm. Additional visual verification via a camera or in person is almost always necessary.

There are products available that combine detection and visual verification into one unit. For short-range applications, combining a passive infrared sensor and a video camera into one housing is increasingly common. When the passive infrared sensor detects motion, the video camera is activated to capture the range of a scene for threat evaluation. In a similar way, any long-range intrusion detection device can be combined with a camera for threat evaluation as well. Alternatively, video motion detection can be used, wherein a camera's video image is utilized to detect motion and threat assessment at the same time. When the video captured by a camera detects motion, one or more alarms are triggered, which may include transmitting of the images for threat assessment. However, the false alarm rate of video motion detection is too high for most intrusion detection applications.

With the advent of microprocessors in the 1980s, video motion detection became more viable. Further advances on more sophisticated motion detection algorithms were made in the 1990s. In recent years, even low cost surveillance systems or cameras have built-in video motion detection capability.

Although the false motion alarm rate has been improved substantially, as stated above, it is still rather high. Moreover, in dark environments such as nighttime surveillance, motion detection is extremely difficult unless adequate light is added to increase visibility. In many situations, adding light is not desirable or feasible. For the above reasons, most video motion detection is used mainly for triggering the start of video recordings or transmission. The security industry's interest in video motion detection peaked in the late 1990s and a very limited number of new products have been introduced in the past decade.

A thermal security camera can overcome the night vision problems of conventional video cameras as it can "see" in total darkness through sensing heat, not light. This characteristic makes a thermal security camera a good video motion detection device, except that the cost is extremely high. Even the most affordable low-resolution thermal camera costs many thousands of dollars. Further, their false alarm rates are as high as conventional cameras. In addition, thermal cameras cannot see the details of a scene, and the images are always in monochromatic format.

DISCLOSURE OF INVENTION

The subject invention overcomes all of the above problems with an innovative form of video motion detection using conventional video cameras. The system is very low cost, has a low false alarm rate and can detect motion effectively even in total darkness. Since it not only detects intrusion reliably, but also can see and verify if the intruding object is a real threat, it is truly an effective threat detection system. Further, its probability of detection is high both day and night, and its vulnerability to defeat is low. Additionally, its power consumption is low, detection range is long, dual transmit and receive stations are not needed, and it can handle difficult terrains. There is no sacrifice of image detail or color as in the case of thermal cameras. The subject invention can work in both outdoor and indoor environments, but its beneficial characteristics make it an ideal choice for outdoor threat detection.

The system of this invention includes apparatus for detecting intrusion into a space and threat assessment. The apparatus includes motion detection light structure for producing a light pattern formed by a plurality of light beams having different lengths and configurations and for projecting the light pattern into the space.

The apparatus also includes video motion detecting structure including a video camera having a field of view including at least some of the light pattern to detect intrusion into the light pattern.

The motion detection light structure includes a light source and a reflector operatively associated with the light source to project the light pattern into the space, with one of the light beams being an elongated light beam extending a distance from the motion detection light structure into the space and another of the light beams surrounding a portion of the elongated light beam adjacent to the motion detector light structure and extending a distance less than the length of the elongated light beam.

The method of the system is a method of detecting intrusion into a space and threat assessment. The method includes the step of positioning motion detection light structure adjacent to the space. The motion detection light structure is employed to produce a light pattern formed by a plurality of light beams having different lengths and configurations.

The motion detection light structure is employed to project the light pattern into the space.

Video motion detection structure including a video camera is employed when practicing the method of the invention. The video camera has a field of view including at least some of the light pattern to detect intrusion into the light pattern.

The motion detection light structure includes a light source and a reflector operatively associated with the light source. The motion detection light structure is employed to project the light pattern into the space, with one of the light beams being an elongated light beam extending a distance from the motion detection light structure into the space and another of the light beams surrounding a portion of the elongated light beam adjacent to the motion detection light structure and extending a distance less than the length of the elongated light beam.

When motion is detected, alarm is triggered which includes transmitting images of the video camera for threat assessment, and turning on a scene illumination light to improve visibility during nighttime operation.

Other features, advantages and objects of the present invention will become apparent with reference to the following description and accompanying drawings.

MODES FOR CARRYING OUT THE INVENTION

Figures 1, 2, 3, 4, 5:
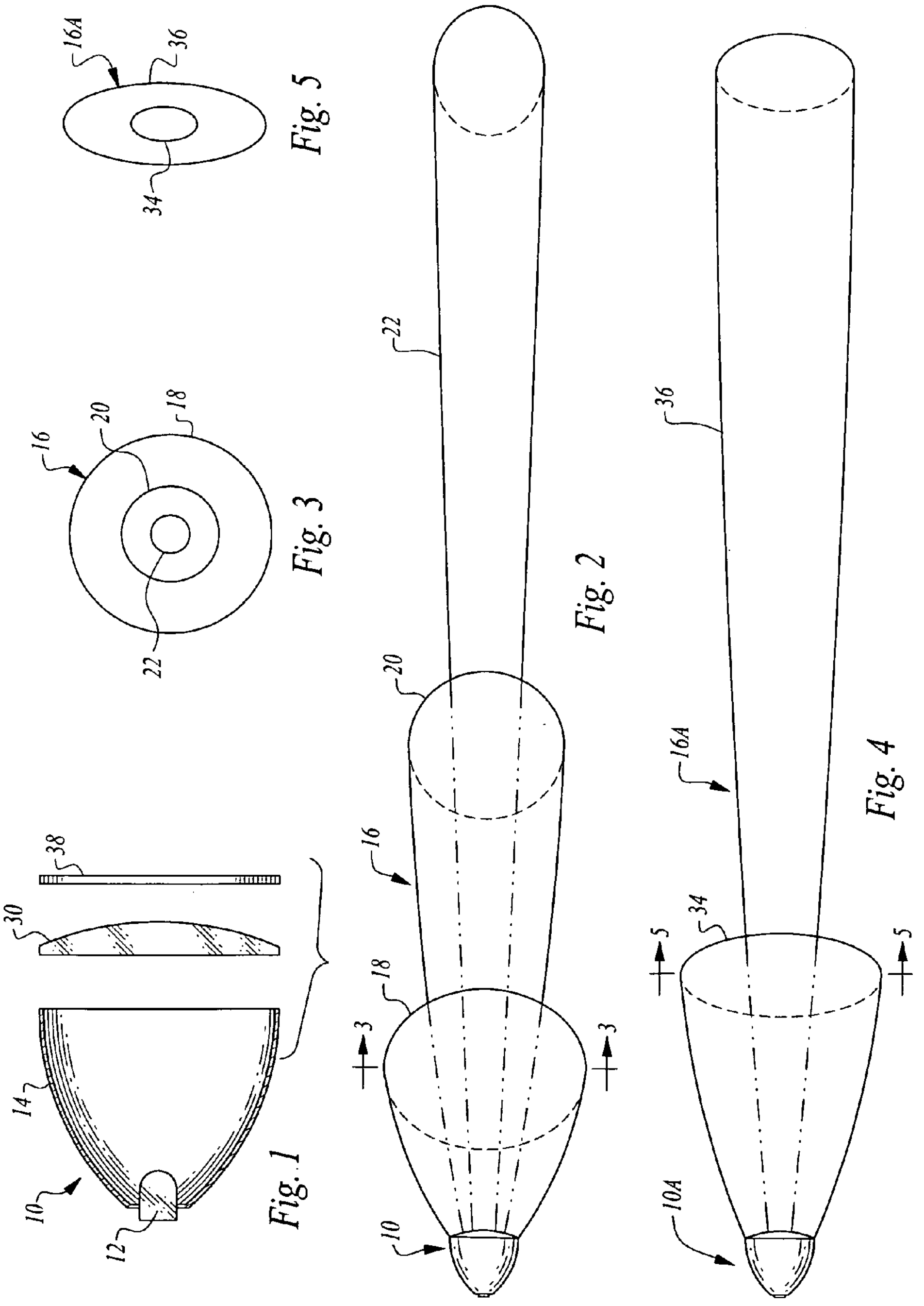
FIG. 1 is an exploded, side elevational view illustrating components of motion detection light structure constructed in accordance with the teachings of the present invention.
FIG. 2 is a view illustrating the motion detection light structure employed to produce three concentric light beams, the beams being of different lengths and of different conical configurations.
FIG. 3 is a diagrammatic view taken along the line 3-3 of FIG. 2 and illustrating the concentric nature of the light beams.
FIG. 4 is a view similar to FIG. 2, but illustrating an embodiment of the motion detection light structure employed to produce two generally conical light beams of oval shape cross-section.
FIG. 5 is a diagrammatic, cross-sectional view taken along line 5-5 of FIG. 4.

The drawing figures are not to scale and are for the purpose of illustrating the cooperative relationship between the structural elements of the system when practicing the present invention.

A conventional video camera with motion detection capability is of limited use for motion detection at night. To overcome this problem, light has to be added. However, adding light creates a number of issues. A light that can project illumination over a long distance requires high wattage and high power consumption. Further, a strong light can be a form of environmental pollution disturbing neighbors or wildlife. To limit the environmental impact, active infrared light in the low visibility or non-visible wave spectrum can be used. However, the cost of long-range active infrared light is high, and high also are the on-going maintenance cost of bulb replacement and cost of power consumption. Using a thermal camera is another option, but it costs even more. Most importantly, the high false alarm rate of video motion detection with conventional or thermal camera must be addressed.

To reduce false motion detection and to provide light needed for motion detection, the subject invention uses a low wattage long-range light with narrow beam (motion detection light). While light of almost any wavelength can be used as a motion detection light, the preferred wavelength is in the infrared or near infrared range. Hunter's red will still work, but regular white light may draw too many insects in an outdoor environment causing false motion detection. In environments where flying insects are prevalent, regular white light should not be used as the motion detection light. Where covert detection is appropriate, non-visible infrared light is the right choice. Sometimes the glow of a red light or near infrared light can provide a form of visual deterrence and can be a good choice in certain applications.

A variety of light sources that are commonly used for high power light beams such as halogen, xenon, and high intensity discharge lights can be used. However, one of the most suitable light sources is the latest generation of LED (light emitting diode) lights. They are extremely energy efficient, offering one of the highest lumens per watt, and are powerful enough to project light a very long distance. High power LED lights were first introduced to the market in the early 2000s. Currently a small 3-watt LED light with a suitable reflector can project a narrow beam that reaches over 600 feet.

Referring now to FIG. 1, motion detection light structure 10 constructed in accordance with the teachings of the present invention includes an LED or other suitable light source 12. A reflector 14 is placed around the light source. The reflector 14 is designed to project a multi-cone light pattern 16, see FIGS. 2 and 3. The light beams 18, 20 and 22 forming the light pattern 16 are of different lengths and configurations and project into a space. The beams are concentric. The benefit of a multi-cone pattern is to allow illumination of the area close to the light plus employ a powerful long distance narrow beam that can cover a very long distance creating a well balanced lit space for the entire distance, covering spaces both near and far. At a minimum, a double-cone pattern is necessary.

To project light a very long distance, a focused narrow beam is the most practical method. However, the narrow beam leaves the space close to the motion detection light without adequate illumination. For the space close to the light, if only one narrow beam is projected and before the beam can fan out into a larger cone shape, a person can duck under or bridge over the very narrow portion of the beam without being illuminated. A wide conical beam near the light eliminates such a problem. For very long distance coverage, multiple cones will allow the longer distance beams to be narrower in a progressive manner, therefore more efficient without sacrificing protection space. In the light pattern 16, the beam 22 is the elongated long distance narrow beam, beams 18, 20 surrounding portions of beam 22. Beam 18 also surrounds beam 20 and covers a wide area near motion detection light structure 10.

For coverage of longer distance without increasing the wattage of the light source, a collimating lens 30 can be added in front of the reflector. The lens focuses light into a narrower but more powerful beam. This lens can also be designed to project a beam of different magnification and shape, such as an elongated oval shape to make the beam more efficient, reducing light coverage to the non-essential areas as well as projecting the beam to an even longer distance. FIGS. 4 and 5 show motion detector light structure 10A producing two generally conic beams 34, 36 having an oval cross section in a light pattern 16A.

If the light source already produces the desired wavelength, a light filter is not necessary. For example, when infrared light is desired, if the LED already generates infrared light, no light filter is necessary. However, if the light source is a halogen bulb, which generates a wide spectrum of wavelength, and red or infrared light is needed, then a red or infrared pass filter can be added respectively. FIG. 1 shows a light filter 38.

Figure 7:
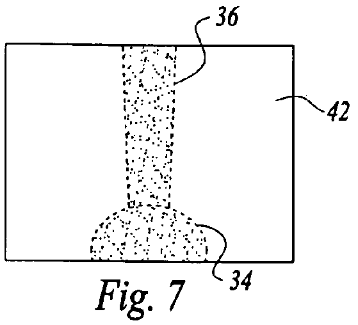
FIG. 7 is a diagrammatic view representing the camera image of the video camera, the image including a portion of the light pattern and areas on opposed sides of the light pattern.
Figure 6:
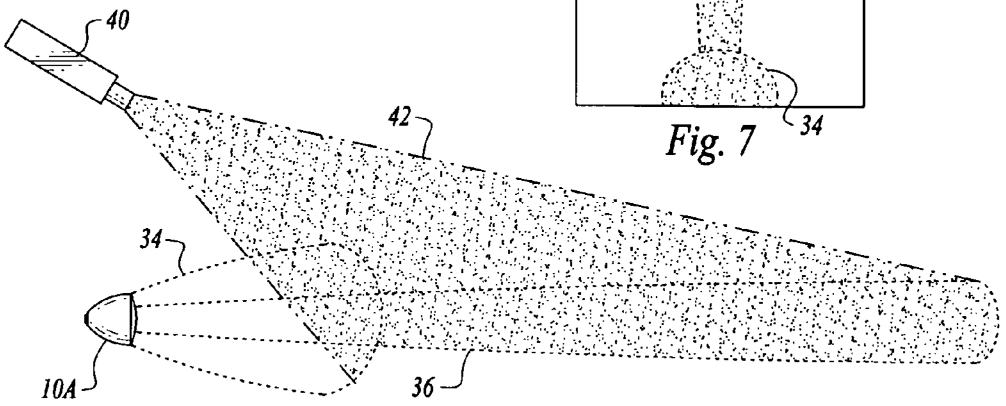
FIG. 6 is a diagrammatic view illustrating motion detection light structure forming two conical beams of light and a video camera viewing portions of the light pattern formed by the light beams.
Figure 8:
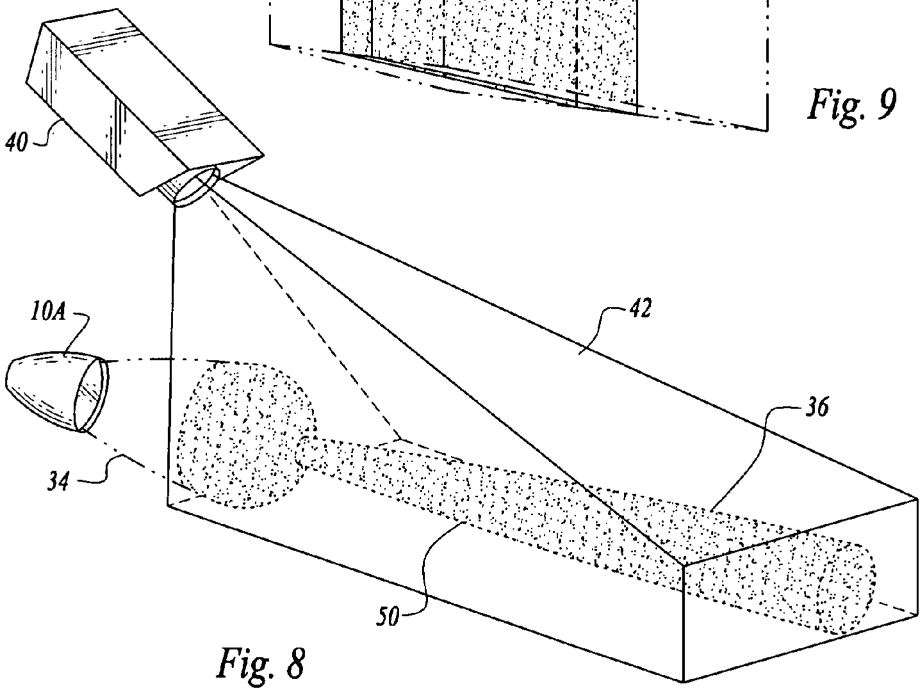
FIG. 8 is a three dimensional representation of the motion detection light structure, the video camera, the light pattern formed by the motion detection light structure and the space seen by the camera.

FIGS. 6, 7 and 8 show the motion detection light pattern extending from motion detection light structure 10A in relation to an image space 42 as viewed by a video camera 40 of video motion detecting structure. A large portion of the image space 42 is not illuminated. In FIG. 6, the image space 42 viewed by the video camera 40 is depicted by shading. In FIG. 7, the projected light pattern is depicted by shading with the rest of image area unshaded. FIG. 8 is a three dimensional showing of the image area and light pattern, shading used to depict a zone of detection 50 where the image area and light pattern intersect and occupy the same space.

Contrary to the conventional wisdom that more light is better, for the purpose of the motion detection light, less but adequate light is the goal. This light is a very critical component of this invention. It allows cameras with limited light sensitivity to be used in nighttime surveillance, it cuts down false alarm rate by not illuminating the large non-essential space typically seen by a video motion detection camera.

The motion detection light structure should be mounted in a manner that can cover the space needing protection. For example, since typical intrusions occur close to the ground, the motion detection light should be mounted relatively close to ground level in such applications.

Video cameras that have video motion detection capabilities come with a wide range of capabilities, from simply detecting pixel variation on a video image to employing algorithms that analyze images across multiple frames before determining if real relevant motion is detected. The more sophisticated the video motion detection ability, the better the performance. This invention works in the same manner regardless of the capability of the camera, however better quality equipment yields better results.

As discussed above, the video motion detection capability may reside within the camera, or it can be embedded in a video recorder, a computer, or a stand-alone video motion detection device. For the purpose of this application, the terms "video motion detecting structure" or "VMDS" refers to any one of the above configurations.

Under low or inadequate lighting conditions, significant background noise may appear on a camera image, which can be mistaken as detected motion. It is important to use a VMDS that has adequate noise suppression capability. This capability may reside within or outside the camera, such as inside an external video motion detection module.

Another desirable feature for a VMDS is the ability to define an area for motion detection within the field of view. In other words, non-essential areas normally within the camera's field of view can be "masked" off from motion detection, creating a narrow zone of detection. While activities within the masked off area(s) still may be viewed, any movements within the masked off area(s) will not trigger motion alarms.

For a typical intrusion detection device, such as a photoelectric beam, the zone of detection is rather narrow. When the detection zone is breached, intrusion alarm is triggered. Although it is not common, video motion detection can be set up to behave similar to a typical intrusion detection device. For example, most intrusion detectors are for detecting intrusion along a perimeter, such as a physical fence or a virtual fence. The detection zone of a VMDS can be configured to do the same. See FIG. 9 wherein the narrow detection zone 55 is narrow. This unconventional way of using video motion detection can reduce false motion alarms without compromising actual intrusion detection effectiveness because a large space within the field of view of a VMDS non-essential for intrusion detection is masked off. Activities within the masked space such as moving debris and tree branches do not generate false motion alarms. During daytime, false motion alarm rate will be drastically reduced.

The above unique approach also allows less capable VMDSs to achieve good results. To illustrate, in FIG. 9 only the portion of the image area corresponding to the narrowed detection zone formed by masking need to be cleared of obstructions in order to detect any intrusion activities without view blockage. For example, tree branches and foliage need to be removed within the camera motion detection zone. However, the foliage and tree branches on both sides of the detection zone can remain undisturbed. Without the approach above, an advanced VMDS must be deployed so that the movements of the foliage and tree branches will not trigger motion alarms. Using the approach mentioned above, an ordinary VMDS can do an effective job.

Figure 10:
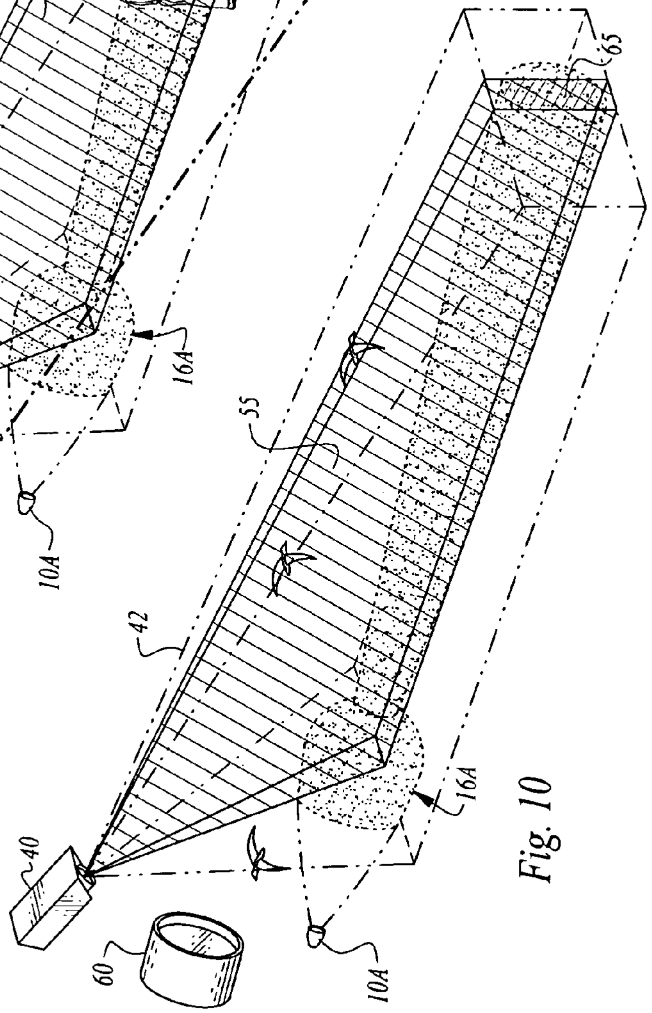
FIG. 10 illustrates a motion detection light structure, a video motion detecting structure and a scene illumination light employed therewith, the Figure further illustrating the scene illumination light non-illuminated while birds fly over the light pattern produced by the motion detection light structure through the space viewed by the camera.

At night, a VMDS with the above set up working in conjunction with the motion detection light structure produces benefits unique to the subject invention. See FIG. 10. Only the zone of detection 65 formed by intersection between the motion detection zone 55 of a VMDS image space 42 and the light pattern 16A from the motion detection light structure 10A can be seen and capable of triggering motion. In other words, the space for possible false alarm is further reduced by the light pattern projected by the motion detection light structure. To illustrate, in daytime, if a bird flies above the light pattern but within the area of view of the video camera, alarm will be triggered, giving a false alarm. However, for the same identical situation at night, since the bird is not illuminated by the motion detection light and not visible by the VMDS, no false alarm is triggered. This example further demonstrates the benefits of using narrow beams for motion detection as opposed to using general scene illumination. As a typical application, the motion detection zone of a VMDS will be set first, and then the light pattern of the motion detection light is set to overlap it. Unlike other types of intrusion detectors, such as passive infrared motion detector, photoelectric beam and microwave, in which the detection zones are not visible, the detection zone of the subject invention can be clearly identified by the VMDS image; no guesswork or time consuming multiple re-adjustments are needed.

Figure 11:
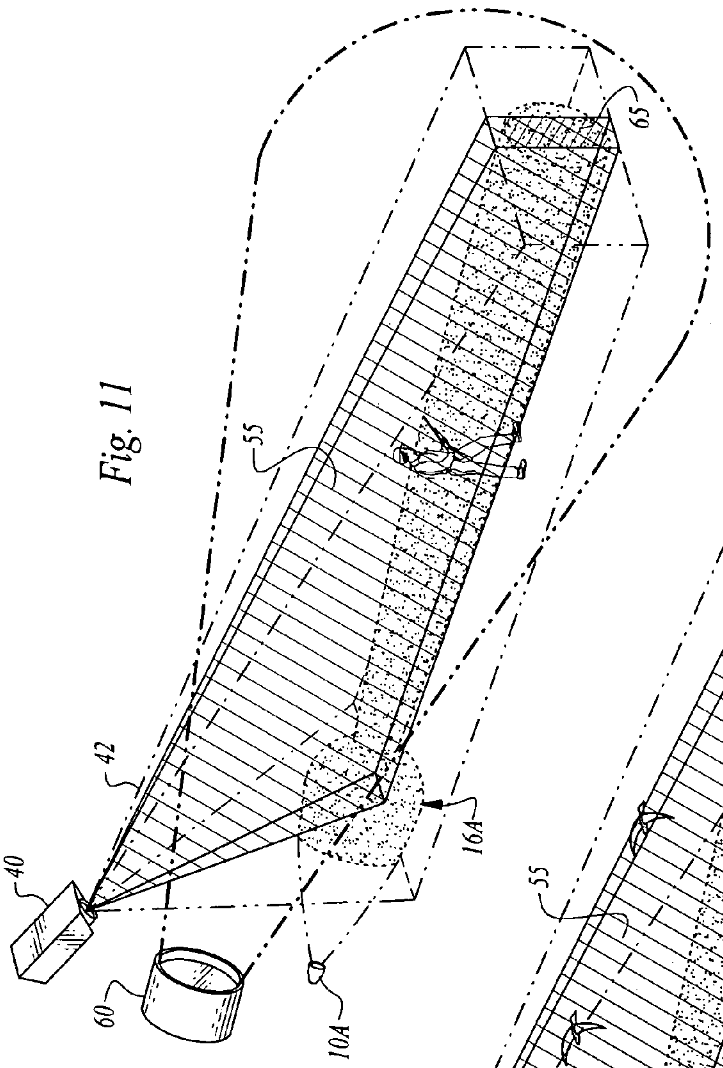
FIG. 11 is a view similar to FIG. 10, but illustrating an individual intruding into the projected light beam and the scene illumination light lit in response to detection of intrusion into the light pattern.

Once a motion alarm is detected, a scene illumination light 60 will be triggered as shown in FIG. 11 wherein a man carrying a gun has intruded into the detection zone 65 to turn on during nighttime operation. The scene illumination light 60 is a high power light source covering the area seen by the field of view of the VMDS. This will allow the camera to see clearly a large area for easier threat evaluation. The VMDS in essence is transformed from a motion detection alarm device into a video surveillance camera.

Since the scene illumination light is turned on only when motion is detected, power consumption is drastically reduced. For protection of remote areas such as those using only solar power, this power saving approach is critical. With this invention, a VMDS can see clearly with powerful light when it is necessary. When it is in a motion detection mode, very little power is consumed, as the motion detection light is very low power.

The scene illumination light 60 can be a regular light or an infrared light. If an application requires covert operation, infrared light is appropriate. For most situations, a regular visible light is preferred as it has additional deterrent effect.

A VMDS can use a black and white or color camera. As a side note, in order to display color correctly, color cameras need to have infrared cut filters to block all infrared lights. Therefore, whenever infrared light is used, such as in the case of the motion detection light, the VMDS should function as a black and white camera. If the scene illumination light is also infrared, a typical black and white VMDS will suffice. However, if a regular light is used for scene illumination, it becomes desirable that a VMDS has a color mode so that additional color information about the intrusion threat such as vehicle color can be obtained. Dual mode cameras called day and night cameras are common, which function as color cameras during day time when light is sufficient, while at night they change to black and white for improved light sensitivity and can also see any reflected infrared light.

For a typical set up, a VMDS uses a dual mode day/night camera. During daytime, it acts like a regular color camera forming motion detection zone as described above. At night, while in motion detection mode, it turns into a black and white camera in order to see the infrared light from the motion detection light. When motion is detected, a non-infrared scene illumination light is turned on. At the same time, the VMDS is switched back to color mode so that it can capture clear color images for threat assessment.

Once motion alarm is triggered by a VMDS, video images will be transmitted for threat evaluation. The most common method of threat assessment is by a trained human monitoring agent who will evaluate the transmitted videos and make a determination if real threats exist as well as the appropriate response action.

Alternatively, threat evaluation can be performed by threat evaluation means in the form of computer software. Software can analyze the images, identify threats, if any, and send messages with corresponding information to the parties who need to respond to the alarm. This type of software, called video analytics, in essence performs the function of a human monitoring agent. While video analytics have improved over the years, they still fall far short of the intelligence of a trained human at this time. However, future improvements may make video analytics a reliable method for threat evaluation.

For simple applications, the above-described components are all that is necessary to create the system of the subject invention. However, for large applications, an additional component is critical to make the invention cost effective and practical.

Figure 13:
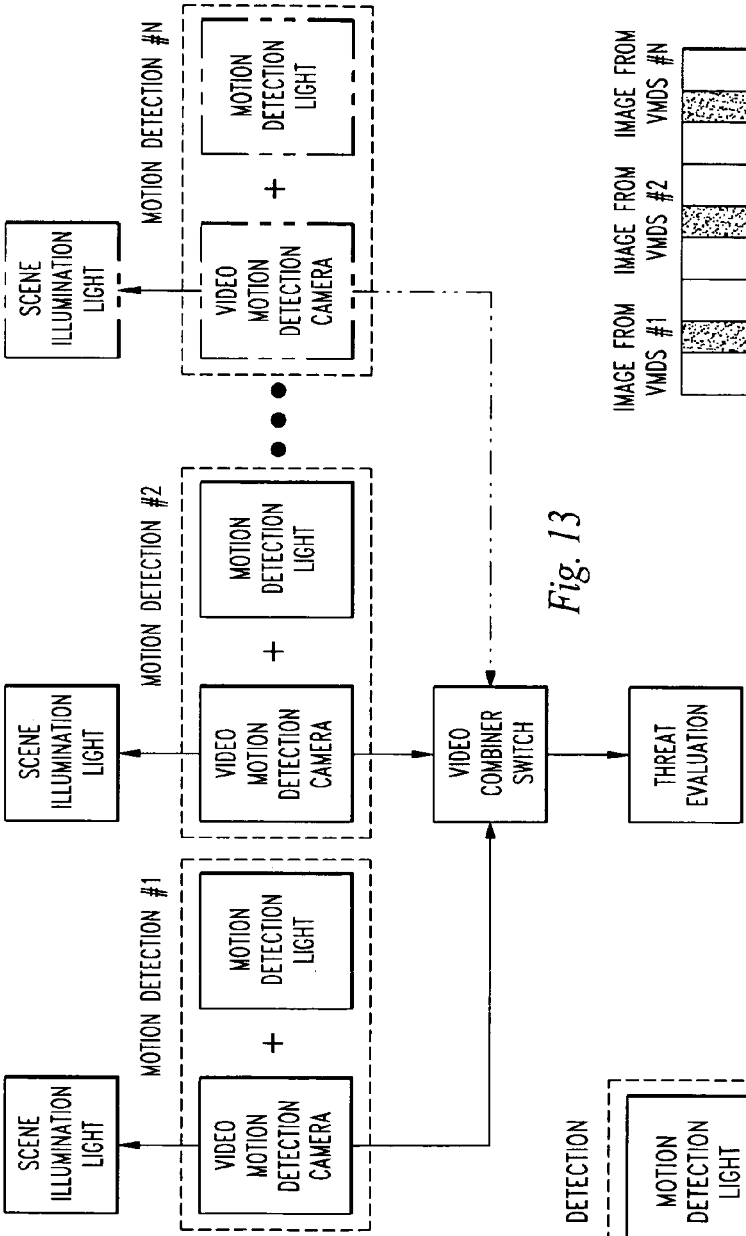
FIG. 13 is a schematic view illustrating operational components, including a video combiner switch, employed in a more sophisticated version of the system.
Figure 12:
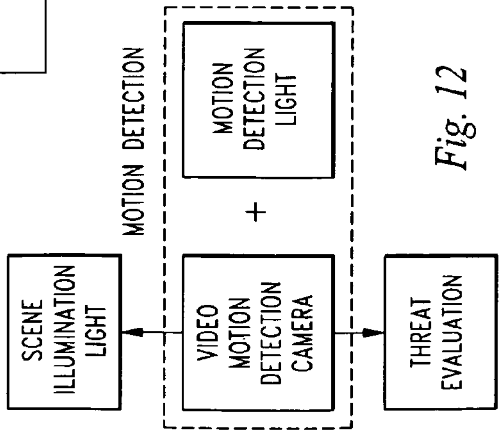
FIG. 12 is a schematic view illustrating operational components of a basic system constructed in accordance with the teachings of the present invention.

To guard against intrusion of a perimeter of significant size, a number of the subject threat detection systems are required. If each VMDS employed occupies a separate video channel, the amount of resources needed to display, record, and monitor them can be substantial. An innovative video combiner switch created as a system productivity enhancement tool provides a drastic improvement in efficiency of the subject invention. The video combiner switch on its own has other applications beyond the subject threat detection system. Any surveillance applications involving long and narrow protection zones can benefit from it. In short, a video combiner switch can merge many VMDS channels into one video channel for display, recording and transmission, and it can also switch and enhance the channels that have detected motion and provide an additional channel for detailed investigation. FIG. 12 shows a basic system of the subject invention and FIG. 13 illustrates a more advanced system with a video combiner switch. A brief background and detailed description of the video combiner switch follow.

Figure 9:
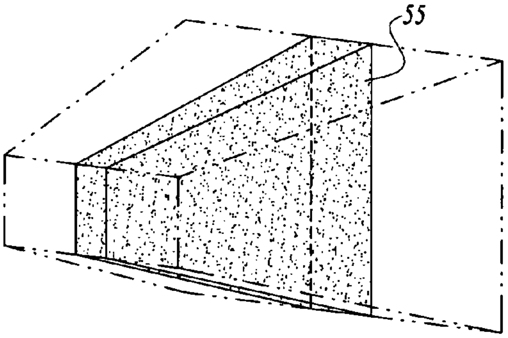
FIG. 9 is a three dimensional diagrammatic representation illustrating an approach of the present system wherein the non-detection zone of a video camera may be masked off from motion detection, the shaded area in the diagram is the detection zone.

Video motion detection is most effective when an object moves across a camera view, not toward or away from a camera. To guard a perimeter against intrusion, the best way to deploy a video camera therefore is to point it alongside the perimeter. From a video camera's perspective, the nature of perimeter protection results in a long and very narrow detection zone spanning between the top and bottom of a video image such as shown in FIG. 9. However, the current video format for security application has a frame aspect ratio of 4:3, which is highly inefficient for perimeter protection. Excessive horizontal space is wasted and this space does not contribute to capturing critical information. With the popularity of high-definition television and wide-screen monitors, the frame aspect ratio is moving towards 16:9, which will make it more inefficient for video perimeter protection. One can rotate a video camera 90 degrees, in effect changing the aspect ratio to 3:4 and 9:16 to improve the image efficiency, however, the image displayed on a monitor, will have an awkward 90 degree rotation unless the monitor is also rotated by 90 degrees as well.

Figure 14:
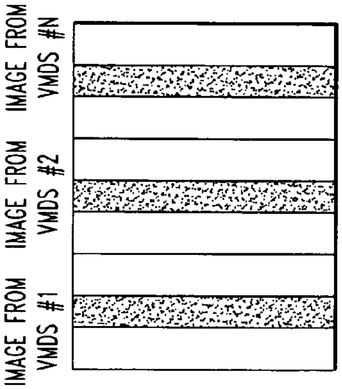
FIG. 14 is a diagrammatic illustration illustrating a video display resulting from use of the system of FIG. 13.

Alternatively, not only can the video combiner switch of the subject invention effectively deal with the inherent display inefficiency of the current video formats for perimeter protection, it can also gain display efficiency by multiple times through combining the videos of multiple VMDSs into one channel (see FIG. 14) and a display monitor need not be rotated. Although monitor rotation is not necessary, it is still preferred that a video camera for perimeter protection be rotated 90 degrees to maximize image efficiency of the image sensor in a camera. For a 4:3 format image sensor, the efficiency gain is 33.3% for a 16:9 format image sensor, the gain is 77.8%. The video combiner switch has a conversion option to rotate the image 90 degrees to display an image in the same orientation of the video camera, similar to printing a document in "portrait" or "landscape" format.

Figure 15A:
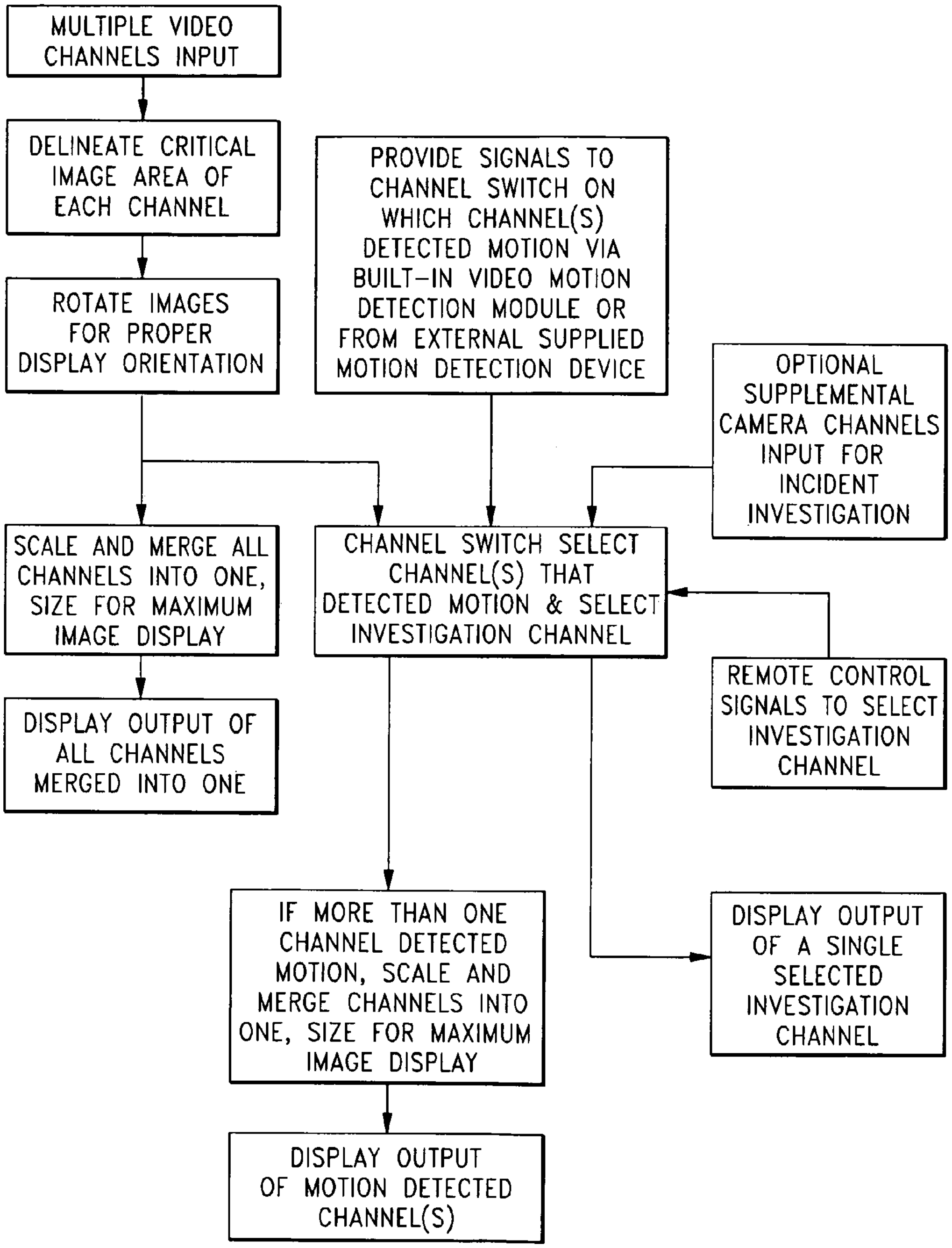
FIG. 15A is a schematic operational diagram of the video combiner switch illustrating the functions thereof.
Figure 15B:
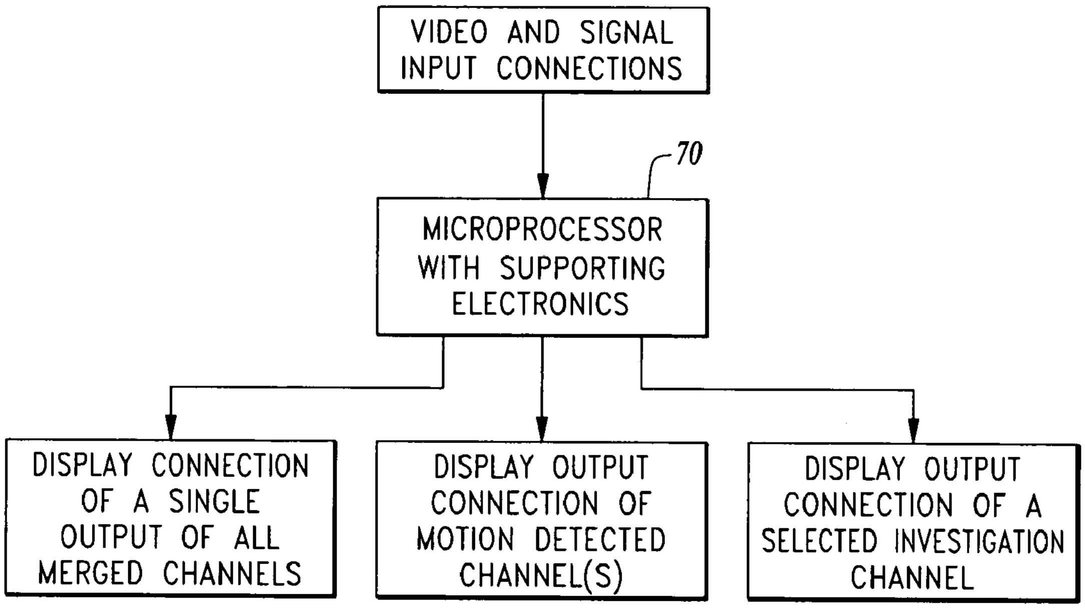
FIG. 15B is a schematic diagram illustrating the video combiner switch in the form of a microprocessor and its relationship to other operational components of the system.

FIG. 15A shows the schematic operational diagram of the video combiner switch. FIG. 15B is a schematic diagram illustrating the video combiner switch in the form of a microprocessor 70. Inputs from multiple video channels are connected to this switch. During setup programming, the individual video image of each of these channels can be selected for display, and the critical image area of each channel is delineated. Using FIG. 14 as an example, the narrow motion detection zone depicted by shading of each image is the critical image area. Position markers of the critical image area can be incorporated to define such area. The balance of the image is deemed non-critical; when display space is limited, portions of these non-critical areas may be truncated as necessary. This step is important for efficient display space management. When appropriate, each image can be rotated 90 degrees to match up with the correct display orientation of the camera as discussed previously.

After going through the above steps, the video signals from all the channels are branched off into two sets of video streams. The first set is used primarily for recording and archive purposes, in which all the video channels are scaled and merged into one channel and automatically sized for largest image display. Instead of recording multiple channels, which will take up a large amount of storage space, significant amounts of images in the non-critical areas are truncated, and data from only one merged channel containing images of all critical areas (and some non-critical areas) are stored.

The second set of video signal streams goes to a "channel switch" which act as a "traffic cop" to allow passage of the video signals from channel(s) that have detected motion or selected for display in the investigation channel. The action of the channel switch is directed by the signal received from a video motion detection device, which can be a built-in module or from an external source such as the video motion alarm output of a camera. For example, if the video motion alarm of Camera 1 is triggered, the video stream from Camera 1 is allowed to pass through the channel switch to the motion detection display channel. If more than one channel detected motion, images from the multiple channels will be scaled and merged into one image, and then automatically adjusted to maximize display size. The motion detected display output has only one channel but it will show simultaneously the images from zero to multiple channels that have detected motion at any given time. Unless continuous motion is detected, each image will be displayed only for a pre-set amount of time before being dropped off. Video motion detection capabilities can be built into the video combiner switch. In such a case, the channel combining and switching function will be directed by the built-in motion detection signals.

In the event that multiple channels detected motion, and the intrusion object might have moved outside of the narrow motion detection zone, it becomes important and advantageous that the full size view of the cameras that detected motion be displayed without any truncation of the non-critical image areas. The channel switch can be programmed to activate automatically this third display output channel when certain conditions are met such as when the motion detection display output contains a merged image from two or more channels. This third display output is called the "investigation channel," which is a single full size channel. Once activated, the investigation channel may be set to display automatically any one of the channels that detected motion in full size image in a sequential manner for a given duration. A monitoring agent using remote control signals can also select and change to any camera within the system for output to the investigation channel. In other words, an agent can continuously monitor all VMDSs via one single motion detection display channel plus an extra channel to display automatically in full size view of any channel detected motion when necessary, and in addition has the ability to investigate in detail with full size view of any camera of his/her choosing any time, an extremely efficient and effective approach. The investigation channel can be switched off automatically when it is no longer necessary.

Optional supplemental cameras may be added to the system, such as cameras pointing to the central critical areas of a premise in addition to the perimeter VMDSs. These cameras are not normally activated, therefore not requiring additional monitoring resources. However, they can assist in a more thorough intrusion investigation of the premise when necessary. Via remote control of the channel switch, a monitoring agent can switch to monitor any of these supplemental cameras like the VMDSs through the investigation channel. An algorithm can also be incorporated into the channel switch to display automatically in a sequential manner those supplemental camera views that are associated with a particular threat detection station through the investigation channel when intrusion is detected by the VMDS of that station. In certain unusual situations of highly complex deployments, it can be beneficial to have a separate investigation channel dedicated to the supplemental cameras. However, in most applications the supplemental cameras should use the same investigation channel for the VMDSs for operational efficiency and functional simplicity.

Besides automatic activation by the channel switch, the investigation channel can also be turned on or off manually at any given time, for example, to perform periodic system reliability check to ensure that all cameras are functioning properly and that the bulbs of the scene illumination lights and the motion detection lights are not burnt.

Circuits and programs for rotating and combining video images are well known. Many cameras and cell phones, for example, can rotate pictures in portrait or landscape format. In the security industry, merging multiple video channels into one screen has been done for many years. The most common implementation has been showing four video channels on one screen. In video monitoring, showing sixteen channels and even thirty-two channels on one display is done regularly. The unique aspect of this invention resides in the switching function, and how the switching function controls the selection and merging of the video channels. The switching function is carried out by a set of switches with logic. A microprocessor 70 is ideally suited for this switching function, which is programmed to carry out the recited operational functions of this invention. A suitably selected microprocessor can also handle the image rotation and merging functions. FIG. 15B illustrates microprocessor 70 with input and output connectors and employing typical supporting electronic components such those for voltage regulation.

A single board computer (SBC) may be utilized instead of a microprocessor with the supporting electronics. This latter approach is particularly applicable for small volume production since it eliminates the time and cost to design, manufacture, and test the circuit board. The implementation efforts become mainly on programming. There are many low cost, off the shelf SBCs on the market.

All the key physical components of the subject invention can be integrated into one enclosure. However, they can also be mounted separately at various locations. For example, a VMDS and motion detection light structure can be mounted on a pole or in one enclosure, while a scene illumination light can be mounted at a separate location; or multiple scene illumination lights can be deployed for a given VMDS.

Figure 16:
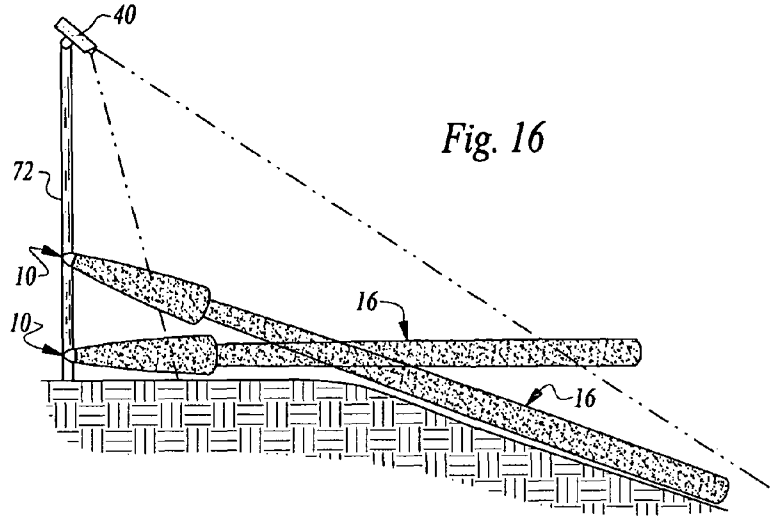
FIG. 16 discloses an embodiment of the invention utilizing two motion detection light structures and a single video motion detecting structure to cover a downhill slope transition.

Further, multiple VMDSs and motion detection light structures can be mounted together to cover a very long leg of a perimeter, and one VMDS can work with multiple motion detection light structures and vice versa. For example, two motion detection light structures 10 are needed to cover a downhill slope transition, but only one VMDS is needed, see FIG. 16. In FIG. 16 the video camera 40 and the two motion detection light structures 10 are mounted on a pole 72.

Figure 17:
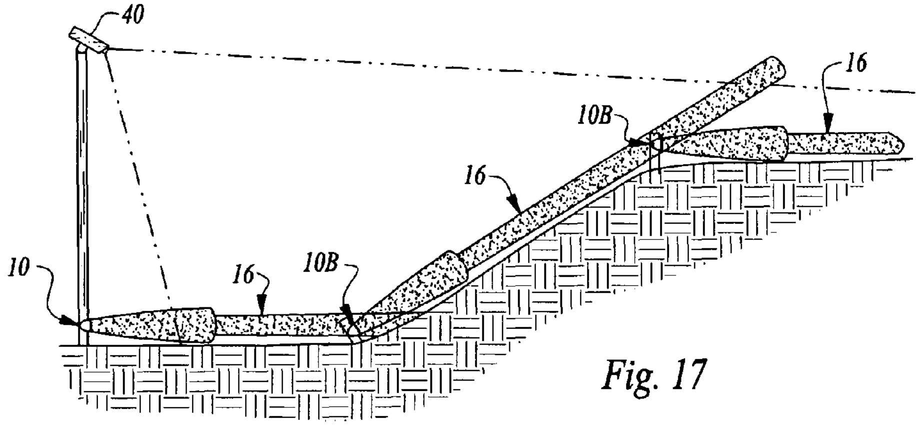
FIG. 17 is a view illustrating three motion detector light structures employed with a single video motion detecting structure to cover an uphill slope.

FIG. 17 shows an application of remotely located motion detection light structures 10B to cover an uphill slope. A remote motion detection light structure needs to be protected by another motion detection light structure and a VMDS. In conjunction with multiple VMDSs with long-range lenses, remote motion detection light structures can significantly increase detection range and cover difficult terrains.

Figure 18:
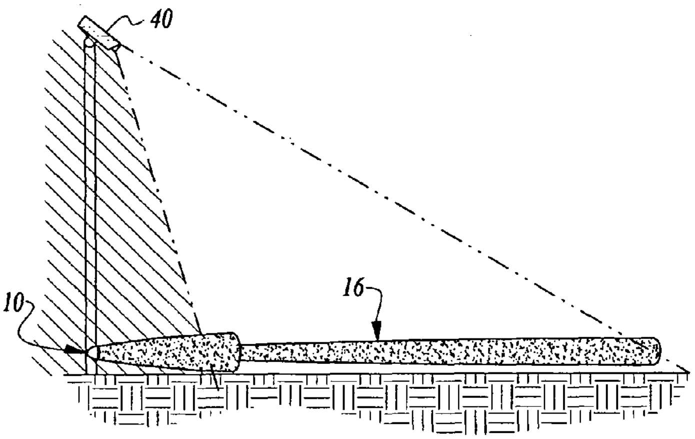
FIG. 18 illustrates an installation employing a single motion detection light structure and a single video motion detecting structure, relative placement thereof for resulting in a blind spot area.
Figure 19:
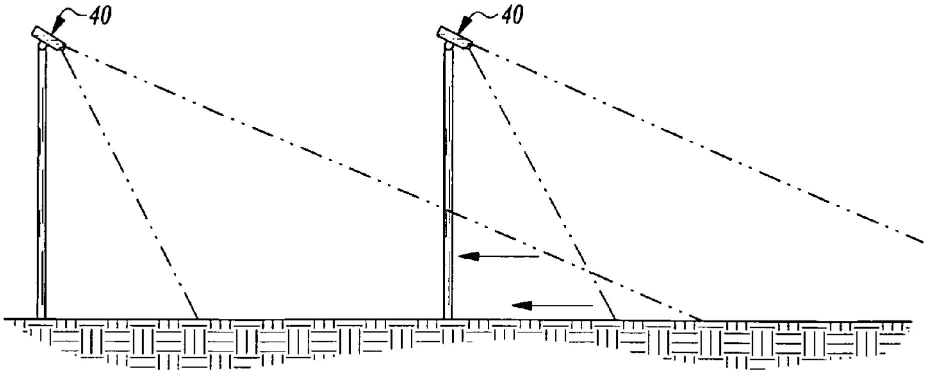
FIG. 19 illustrates another blind spot situation wherein two video cameras are employed, a blind spot at one camera being covered by an upstream camera.

When a situation permits, a VMDS should be mounted not much higher than the height of a motion detection light structure to reduce blind spot. For instance, when a VMDS is mounted high as shown in FIG. 18, a blind spot in which motion and view cannot be captured by the camera develops. A wider angle lens can be used to address this problem, but the size of an object in the camera view will become small and makes it harder for motion detection. Further, a user needs to be aware of the starting point of an effective detection zone. Alternatively, the blind spot can be covered by another camera upstream, see FIG. 19.

Figure 20:
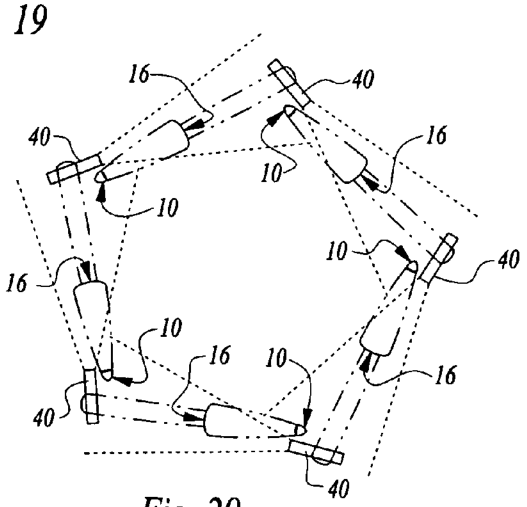
FIG. 20 illustrates a plurality of apparatuses positioned in a loop configuration.
Figure 21:
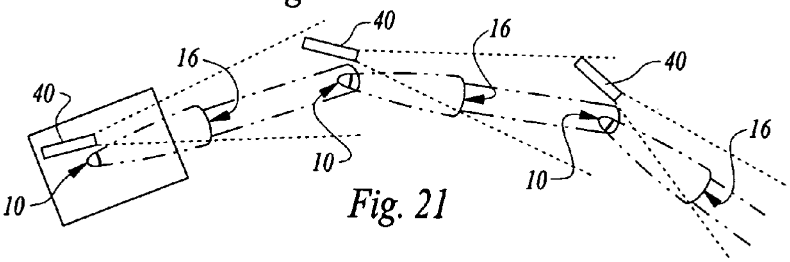
FIG. 21 provides another embodiment wherein only a partial loop is formed and a self-protection camera is mounted above at a starting station.

For typical perimeter protection, the systems can be deployed in a loop configuration such as the example shown in FIG. 20. The most important benefit of this configuration is that each station is protected by another station. Where a loop configuration is not possible, a self-protection camera at a starting station, mounted high above it, is prudent and necessary, see FIG. 21. The self-protection camera is itself a VMDS. If a situation calls for only one stand-alone camera station, this station shall also have a self-protection camera mounted high above it, similar to the starting station as shown in FIG. 21. It should be noted that each camera station may consist of one or more threat detection systems. One or more of the camera stations may include a scene illumination light for illuminating the space associated therewith responsive to detection of intrusion therein. In FIGS. 20 and 21, scene illumination lights are not shown.

Fog creates significant challenges to human and video surveillance. The key problem is the reduction of visibility. In aviation forecast, fog is defined as having a visibility range of 201 to 1000 meters, thick fog: 51 to 200 meters, and dense fog: less than 50 meters. Depending on geographical conditions, some areas almost never see fog, while others encounter fog regularly. Among foggy areas, the typical fog density also varies widely. When deploying the subject invention in locations where fog is a consideration, the distance between the camera stations need to be shortened accordingly. One must first determine the visibility range of the fog at such locations prior to deployment.

For instance, under thick fog condition and assuming 300 feet visibility, the camera station spacing in FIGS. 20 and 21 should not exceed 300 feet minus the blind spot distance of the downstream camera station. Since most VMDSs have a comfortable detection range of about 350 feet, the above thick fog example reduces the deployment efficiency of the subject threat detection system (but not its effectiveness). Further, range extension technique such as using multiple VMDSs with high power lenses to cover one long leg of a perimeter should not be used in heavy fog areas.

In the various diagrams used for illustration, the detection equipment is shown mounted on a pole. In actual applications, they can indeed be mounted on a tall pole with enclosures protecting individual components. Where high camera vantage point is necessary, tall pole mounting is appropriate. An adequate size stiff pole shall be used to avoid camera shaking caused by wind, which may trigger false motion detection. However, for the vast majority of the perimeter protection applications, the equipment can be mounted and enclosed with lower cost and more appropriate enclosures such as the wind vibration isolated enclosure shown in my co-pending U.S. patent application Ser. No. 12/221,041, filed Jul. 30, 2008. Where applicable, the system components with proper enclosures can also be mounted on solid structures. Regardless of the type of mounting and enclosure, the costs of erecting and protecting a camera station are significant considerations.

Figure 22:
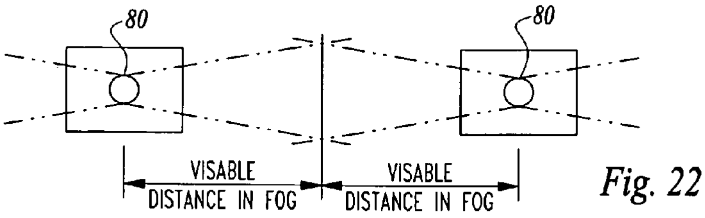
FIG. 22 provides an illustration of camera station deployments which may be utilized in foggy areas, for example.

To reduce the number of camera stations in foggy areas, a deployment method as shown in FIG. 22 can be used. In this approach, each camera station 80 has a self-protection camera as discussed in connection with FIG. 21. Two opposed cameras are located at each station to present camera views in opposed directions. The double headed arrows in FIG. 22 represent visible distance in fog. It approximately doubles the camera station spacing as compared to the method shown in FIGS. 20 and 21, to two times the fog visibility distance. The extra cost is an additional self-protection VMDS for each camera station, which is significantly less than the cost of the enclosure and installation of a camera station. In the above example, the camera station spacing is increased from 300 to 600 feet.

Regardless of the type of intrusion detection device deployed, after intrusion alarm is triggered, it is always preferable to perform a visual verification. Unless very expensive thermal imaging cameras are used, which can see through fog, both human and conventional video cameras are subject to the visibility distance limitation of the fog at a given location. The effective visual verification distance in fog is often the true range-limiting factor, not the distance capability of a long-range motion-triggering device. For areas with fog visibility of 350 feet and above, the existence of fog does not reduce the efficiency of the subject invention.

As discussed, using the method demonstrated in FIG. 22, the subject invention can double the video camera verification distance by a factor of two. In an extremely heavy dense fog situation with visibility down to, say 100 feet, the subject threat detection system can still effectively detect and verify threats up to a respectable 200 feet. Where fog is not a consideration, the camera station spacing of the subject invention can easily exceed 2,000 feet.

Fog not only attenuates, but also diffuses light. This is the reason why high beams on a vehicle make it difficult to see in fog. The moisture droplets in the fog diffuse and reflect the high beam light directly back to the driver. Low beams and fog lights are needed to improve the angle of reflection. In foggy environments, the scene illumination light and the motion detection light structure therefore should be mounted in such a way as to avoid blinding reflection of the fog. For most situations, it should be mounted at a distance significantly below the camera to avoid undesirable reflections. In the deployment configuration as shown in FIG. 22, both the scene illumination lights and motion detection light structure should be pointed downward slightly so that the lights would only overlap by a small distance beyond the mid-point of the camera station spacing to avoid blinding the camera of the opposing station.

Rain and snow have similar reflection characteristics as fog. Proper mounting of the lights as discussed above to avoid undesirable reflections is an important part of successful deployment. On certain VMDSs, rain and snow may cause false motion detection. If a detection distance is relatively short, without sacrificing the probability of detection, many average performance VMDSs can reduce false motion detection due to rain and snow by simply reducing the detection sensitivity. For a more definitive solution, using higher performance motion detection modules that can specify detection object size, for example, can easily avoid such problems.

Video and alarm signals can be transmitted between camera stations and to the video combiner switch wirelessly or by wire. Power to each camera station including the scene illumination lights and motion detection light structures can be provided locally at each station if available. Alternatively, they can also be solar-powered, as the power consumption of the subject invention is low. In addition, the low voltage powered security system disclosed in my co-pending U.S. patent application Ser. No. 12/287,376, filed May 1, 2009, can provide a very cost effective approach to supply power to the subject invention.

It will be appreciated that a number of changes can be made and different embodiments may exist and still fall within the scope of the invention. For example, multiple detection light structures can be spaced from the motion detecting structure. This would be important for example for rough terrains and long distance applications.

The invention claimed is:

1. Apparatus for detecting intrusion into a space, said apparatus including, in combination:

motion detection light structure for simultaneously producing a plurality of light beams having different lengths and solid conic configurations and for projecting said light beams into said space, said projected plurality of light beams including a conic first light beam configuration having a longitudinal axis and a conic second light beam completely surrounding said first light beam immediately adjacent to said motion detection light structure, said motion detection light structure including a light source and a reflector structure operatively associated with said light source to project said plurality of light beams into said space with the first light beam being an elongated light beam extending a first distance from said motion detection light structure into said space when not interrupted by an object in said space and the second light beam extending a second distance from said motion detection light structure into said space when not interrupted by an object in said space, said second distance being less than said first distance whereby said first light beam is completely embedded in said second light beam immediately adjacent to said motion detection light structure; and video motion detecting structure including a video camera having a field of view including at least some of said light beams produced by said motion detection light structure to detect intrusion into said space.

2. The apparatus according to claim 1 wherein said motion detection light structure additionally includes a collimating lens positioned to receive light reflected by said reflector and form said first light beam.

3. The apparatus according to claim 1 wherein said light source comprises at least one light emitting diode.

4. The apparatus according to claim 1 wherein said motion detection light structure additionally includes a light filter positioned to receive light reflected by said reflector structure.

5. The apparatus according to claim 1 wherein said video camera is located adjacent to said motion detection light structure, spaced from said light beams, and aimed toward said light beams at an angle to the longitudinal axis of said first light beam.

6. The apparatus according to claim 1 additionally including masking means operatively associated with said video camera to mask and restrict certain areas for motion detection within the field of view thereof.

7. The apparatus according to claim 1 additionally including a scene illumination light operatively associated with said video motion detecting structure illuminated in response to detection by said video motion detecting structure of object intrusion during nighttime operation.

8. The apparatus according to claim 1 additionally including threat evaluation means operatively associated with said video motion detecting structure for analyzing images transmitted from said video camera.

9. The apparatus according to claim 1 additionally including video combiner switch structure operatively associated with said video camera for displaying video images transmitted from said video camera along with images from other video cameras.

10. The apparatus according to claim 1 wherein said motion detection light structure is one of a plurality of motion detection light structures operatively associated with said video motion detecting structure whereby light beams produced by said plurality of motion detection light structures are within the field of view of said video camera.

11. The apparatus according to claim 1 wherein said video motion detecting structure is one of a plurality of video motion detecting structures operatively associated with said motion detection light structure.

12. The apparatus according to claim 1 wherein said motion detection light structure is one of a plurality of motion detection light structures remotely spaced from the video motion detecting structure.

13. The apparatus according to claim 1 additionally including a self protection video motion detecting structure mounted in an elevated position.

14. The apparatus according to claim 1 wherein said motion detection light structure includes an infrared light source.

15. A plurality of apparatuses for detecting intrusion into a plurality of spaces, each apparatus of said plurality of apparatuses including, in combination:

motion detection light structure for simultaneously producing a plurality of light beams having different lengths and solid conic configurations and for projecting said light beams produced thereby into a space of said plurality of spaces, said plurality of light beams including a conic first light beam and a conic second light beam completely surrounding said first light beam immediately adjacent to said motion detector light structure, said motion detection light structure including a light source and a reflector structure operatively associated with said light source to project said plurality of light beams into said space with the first light beam being an elongated light beam extending a first distance from said motion detection light structure into said space when not interrupted by an object in said space and the second light beam extending a second distance from said motion detection light structure into said space when not interrupted by an object in said space, said second distance being less than said first distance whereby said first light beam is completely embedded in said second light beam immediately adjacent to said motion detection light structure; and video motion detecting structure including a video camera having a field of view including at least some of the light beams produced by the motion detection light structure to detect intrusion into said space.

16. The plurality of apparatuses according to claim 15 wherein a first apparatus thereof is spaced from a second apparatus thereof.

17. The plurality of apparatuses according to claim 16 wherein the light beams of the first apparatus are directed toward the second apparatus and wherein the spacing between the first apparatus and the second apparatus is less than the length of the first light beam produced by said first apparatus.

18. The plurality of apparatuses according to claim 16 wherein the video cameras and motion detection light structures of the apparatuses are pointed at opposing apparatuses and wherein the apparatuses have self protection video motion detecting structures.

19. The plurality of apparatuses according to claim 15 wherein said each apparatus thereof receives a first light beam from another apparatus thereof.

20. The plurality of apparatuses according to claim 19 positioned along the periphery of an area with the first light beams thereof extending about said area.

21. The plurality of apparatuses according to claim 15 wherein at least one of said apparatuses includes a scene illumination light turned on when motion is detected.

22. A method of detecting intrusion into a space, said method including the steps of:

positioning a motion detection light structure including a light source and a reflector structure adjacent to said space;

employing said motion detection light structure to produce a plurality of light beams having different lengths and solid conic configurations;

employing said motion detection light structure to project said plurality of light beams into said space, said plurality of light beams including a conic first light beam and a conic second light beam completely surrounding said first light beam immediately adjacent to said motion detector light structure;

utilizing said reflector structure and said light source to project said plurality of light beams into said space with the first light beam being an elongated light beam extending a first distance from said motion detection light structure into said space when not interrupted by an object in said space and the second light beam extending a second distance from said motion detection light structure into said space when not interrupted by an object in said space, said second distance being less than said first distance whereby said first light beam is completely embedded in said second light beam immediately adjacent to said motion detection light structure; and employing video motion detecting structure including a video camera having a field of view including at least some of said light beams to detect intrusion into said space.

23. The method according to claim 22 including the steps of incorporating a collimating lens into said motion detection light structure to receive light reflected by said reflector and employing said collimating lens to focus light received from said reflector.

24. The method according to claim 22 including incorporating a light filter into said motion detection light structure, said light filter being positioned to receive light reflected by said reflector.

25. The method according to claim 22 wherein said light beams are substantially concentric and wherein said video camera is located adjacent to said motion detection light structure, spaced from said light beams, and aimed at an angle to the longitudinal axis of said first light beam.

26. The method according to claim 22 additionally including the step of masking and restricting certain areas for motion detection within the field of view of said video camera.

27. The method according to claim 22 additionally including the steps of employing a scene illumination light in operative association with said video motion detecting structure and illuminating said scene illumination light in response to detection by said video motion detecting structure of object intrusion during nighttime operation.

28. The method according to claim 22 additionally including the steps of employing threat evaluation means in operative association with said video motion detecting structure and utilizing said threat evaluation means to analyze images transmitted from said video camera.

29. The method according to claim 22 including the step of employing video combiner switch structure in operative association with said video camera to display video images transmitted from said video camera along with images from other video cameras.

30. The method according to claim 22 wherein said motion detection light structure is one of a plurality of motion detection light structures operatively associated with said video motion detecting structure, light beams produced by said plurality of motion detection light structures being located within the field of view of said video camera.

31. The method according to claim 22 wherein said video motion detecting structure is one of a plurality of video motion detecting structures operatively associated with said motion detection light structure.

32. A method of employing a plurality of apparatuses for detecting intrusion into a plurality of spaces, each apparatus of said plurality of apparatuses including motion detection light structure and video motion detecting structure, with respect to each apparatus the method comprising the steps of:

utilizing the motion detection light structure of the apparatus to produce a plurality of light beams having different lengths and solid conic configurations and project the plurality of light beams produced thereby into a space of said plurality of spaces, said plurality of light beams including a conic first light beam and a conic second light beam completely surrounding said first light beam immediately adjacent to said motion detector light structure;

utilizing said reflector structure and said light source to project said plurality of light beams into said space with the first light beam being an elongated light beam extending a first distance from said motion detection light structure into said space when not interrupted by an object in said space and the second light beam extending a second distance from said motion detection light structure into said space when not interrupted by an object in said space, said second distance being less than said first distance whereby said first light beam is completely embedded in said second light beam immediately adjacent to said motion detection light structure; and utilizing in the video motion detecting structure of the apparatus a video camera having a field of view including at least some of said light beams produced by the motion detection light structure thereof to detect intrusion into said space.

33. The method of claim 32 including the steps of directing the light beams of a first apparatus toward a second apparatus and maintaining the spacing between the first apparatus and the second apparatus less than the length of the first light beam produced by the first apparatus.

34. The method according to claim 33 including the step of employing a scene illumination light to illuminate at least one of said plurality of spaces responsive to detection of object intrusion therein.

35. The method according to claim 32 wherein said each apparatus receives a light beam from another apparatus.

36. The method according to claim 35 wherein the apparatuses are positioned along the periphery of an area with the light beams thereof extending about said area.

37. The method according to claim 32 wherein video cameras and motion detection light structures of the apparatuses are pointed at opposing apparatuses and self protection video motion detecting structures are incorporated in the apparatuses.

* * * * *